(No Model.)

G. A. WILLARD.
WIPER FOR LASTING MACHINES.

No. 561,189. Patented June 2, 1896.

WITNESSES:
H. R. Guillo.
O. R. Mitchell.

INVENTOR
George A. Willard
BY
Maynadier & Mitchell
ATTORNEYS.

UNITED STATES PATENT OFFICE.

GEORGE AUSTIN WILLARD, OF PETERBOROUGH, NEW HAMPSHIRE, ASSIGNOR TO THE CHASE LASTING MACHINE COMPANY, OF MAINE.

WIPER FOR LASTING-MACHINES.

SPECIFICATION forming part of Letters Patent No. 561,189, dated June 2, 1896.

Application filed October 9, 1895. Serial No. 565,204. (No model.)

*To all whom it may concern:*

Be it known that I, GEORGE AUSTIN WILLARD, of Peterborough, in the county of Hillsborough and State of New Hampshire, have invented an Improved Wiper for Lasting-Machines, of which the following is a specification, reference being had to the accompanying drawings, in which—

Figure 1:
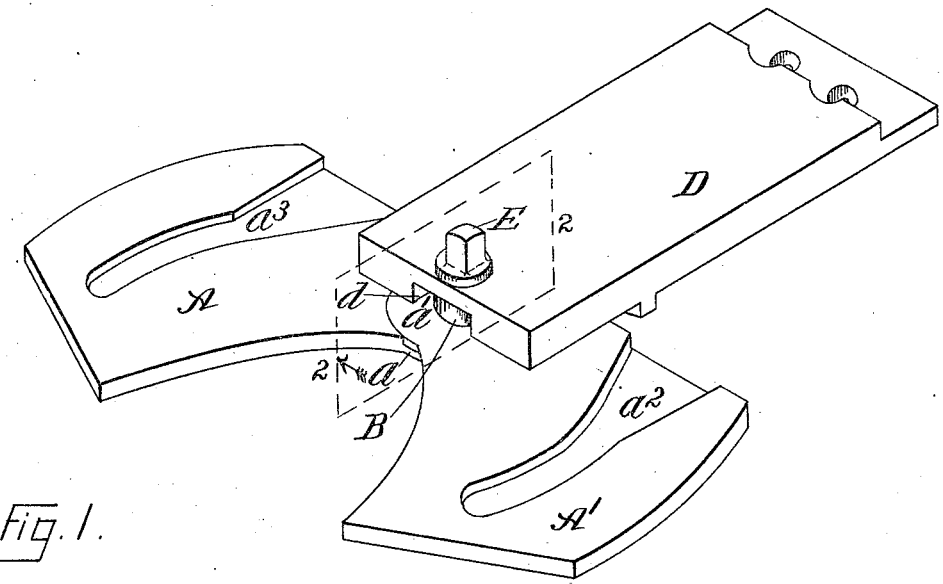
Figure 2:
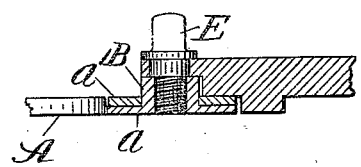

Figure 1 shows the wiper in perspective. Fig. 2 is a section on line 2 2 of Fig. 1.

Wipers for the toe parts of shoes, used in the lasting process, when performed by machinery, are old and well known, and my improved wiper differs from wipers formerly used only in details of construction, which increase the certainty and efficiency of its operation and enable the operator to detach the jaws of the wiper from the support and replace them by other jaws of a different contour, when desired, without removing the support from the lasting-machine. Heretofore it has been impossible to accomplish this result, owing to the means employed to attach the jaws to the support and to the form of the cam-slots in the upper surfaces of the jaws. The attachment of the jaws to the support has heretofore been effected by means of a bolt passing upward through the inner end of the jaws and the outer end of the support, the bolt being headed at both ends, so that the three parts were permanently held in proper relation to one another, the jaws being free to move upon the bolt as a pivot, as will be clear to all skilled in the art without more description. The cam-slots in the upper surfaces of the jaws have heretofore been closed at their rear ends.

In my improved wiper the jaw A carries upon the upper side of its rear extremity a boss B, and the jaw A' has a corresponding hole through which the boss B passes. The inner ends $a$ $a'$ of the jaws are countersunk to half their thickness, so that the two jaws fit together upon one level. The boss B extends above the surface of jaw A' and a recess $d$ in the under outer end of the support D receives this boss when the wiper is in operation. The outer end of this recess is open to the front of the support. A screw-threaded bolt E passes through a hole at the outer end of the support D and into a screw-threaded hole in the boss B. This bolt holds the three parts of the wiper together, and has a shoulder $e$, which brings up against the top of boss B and prevents the jaws being drawn with undue force against the bottom of support D. The cam-slots $a^2$ $a^3$ in the upper surface of the jaws A A' are open to the rear.

It will be obvious that the organization of parts above described permits the jaws A A' to be removed by merely unscrewing the bolt E. The bolt E being removed the jaws may be pulled forward, the opening at the front end of the recess $d$ allowing the boss B to pass out and the openings at the rear ends of cam-slots $a^2$ $a^3$ permitting the projections upon the jaw-actuating mechanism which work in the cam-slots to pass out at the rear. The jaws when detached from the support D are still connected by the boss B.

What I claim as my invention is—

1. In a lasting-machine the combination of wiper-jaws connected by a boss and having rearwardly-opening cam-slots; a support having a recess opening forwardly and a screw-threaded connecting-bolt, all organized substantially as described.

2. In a lasting-machine the combination of wiper-jaws connected by a boss and having rearwardly-opening cam-slots; a support and a screw-threaded connecting-bolt, all organized substantially as described.

GEORGE AUSTIN WILLARD.

Witnesses:
O. R. MITCHELL,
JOHN R. SNOW.